US012633039B2

(12) United States Patent
  Charles

(10) Patent No.: US 12,633,039 B2
(45) Date of Patent: May 19, 2026

(54) VISUALIZATION SYSTEM WITH STEREO-VOLUMETRIC INTRAOPERATIVE OCT AND STEREOSCOPIC CAMERA

(71) Applicant: Alcon Inc., Fribourg (CH)

(72) Inventor: Steven T. Charles, Memphis, TN (US)

(73) Assignee: Alcon Inc., Fribourg (CH)

( * ) Notice: Subject to any disclaimer, the term of this patent is extended or adjusted under 35 U.S.C. 154(b) by 365 days.

(21) Appl. No.: 18/354,092

(22) Filed: Jul. 18, 2023

(65) Prior Publication Data

US 2024/0070970 A1     Feb. 29, 2024

Related U.S. Application Data

(60) Provisional application No. 63/400,276, filed on Aug. 23, 2022.

(51) Int. Cl.
  *G06T 15/08*     (2011.01)
(52) U.S. Cl.
  CPC .... *G06T 15/08* (2013.01); *G06T 2207/10012* (2013.01); *G06T 2207/10101* (2013.01); *G06T 2207/30041* (2013.01)
(58) Field of Classification Search
  CPC ........... G06T 15/08; G06T 2207/10012; G06T 2207/10101; G06T 2207/30041; G06T 2210/41; G06T 2210/62; A61B 3/0058; A61B 3/0025; A61B 3/132; A61B 3/102; H04N 13/204
  USPC ........................................................ 351/206
  See application file for complete search history.

(56) References Cited

U.S. PATENT DOCUMENTS

| | | | |
|---|---|---|---|
| 10,064,549 B2 | 9/2018 | Charles | |
| 2005/0214773 A1* | 9/2005 | Edwards | ........ C12Y 207/01069 |
| | | | 435/193 |
| 2010/0110376 A1 | 5/2010 | Everett et al. | |
| 2016/0228000 A1* | 8/2016 | Spaide | .................. G06T 7/0012 |
| 2017/0135573 A1* | 5/2017 | Charles | ................ A61B 3/0058 |
| 2019/0201042 A1* | 7/2019 | Nott | ...................... A61B 34/76 |
| 2019/0201074 A1* | 7/2019 | Yates | ..................... A61B 34/30 |
| 2019/0343383 A1 | 11/2019 | Spaide | |

(Continued)

OTHER PUBLICATIONS

Weiss, J. et al., Layer-Aware iOCT Volume Rendering for Retinal Surgery, Eurographics Workshop on Visual Computing for Biology and Medicine, 2019.

(Continued)

*Primary Examiner* — Mohammed A Hasan
(74) *Attorney, Agent, or Firm* — Sanders IP Law

(57) ABSTRACT

A visualization system includes a housing assembly having a head unit configured to be at least partially directed towards a target site. An optical coherence tomography (OCT) module and a stereoscopic camera are located in the housing assembly. A controller is in communication with the OCT module and the stereoscopic camera. The controller is adapted to acquire left OCT data and right OCT data of the target site, via the OCT module, and synchronously acquire left camera data and right camera data of the target site, via the stereoscopic camera. The controller is adapted to generate volume-rendered images, including: first and second OCT images based on the OCT data and first and second camera images based on the camera data. The first and second OCT images and the first and second camera images have matching parallax.

17 Claims, 6 Drawing Sheets

(56)  References Cited

U.S. PATENT DOCUMENTS

| | | | |
|---|---|---|---|
| 2020/0030038 A1* | 1/2020 | Wang ..................... | A61B 90/13 |
| 2021/0169320 A1 | 6/2021 | Tripathi et al. | |
| 2022/0110527 A1* | 4/2022 | Foster ................. | G02B 21/006 |

OTHER PUBLICATIONS

Zhao, J. et al., Angular compounding for speckle reduction in optical coherence tomography using geometric image registration algorithm and digital focusing, Nature Search Scientific Reports, 2020.

Lippok, N. et al., Extended Coherence Length and Depth Ranging Using a Fourier-Domain Mode-Locked Frequency Comb and Circular Interferometric Ranging, Physical Review Applied Jan. 11, 2019.

* cited by examiner

300

302
Send command to initiate combined stereo-volumetric mode

304
Receive left OCT scan data and right OCT scan data

306
Synchronously obtain left and right camera data

308
Generate volume-rendered images from OCT, camera data

310
Display stereo OCT and camera images adjacently 606    635    608

602

604

610

VISUALIZATION SYSTEM WITH STEREO-VOLUMETRIC INTRAOPERATIVE OCT AND STEREOSCOPIC CAMERA

CROSS REFERENCE TO RELATED APPLICATION

The present application claims the benefit of priority to U.S. Provisional Application No. 63/400,276 filed Aug. 23, 2022, which is hereby incorporated by reference in its entirety.

INTRODUCTION

The present disclosure relates to a visualization system with a stereo-volumetric intraoperative OCT (optical coherence tomography) module and stereoscopic camera. Various imaging modalities are commonly employed throughout the world to image various parts of the human body. For example, in the area of ophthalmology, OCT-based technologies have proven themselves to be advantageous in many different contexts, such as visualizing the presence of retinal detachment, retinoschisis, macular disorders, intraocular foreign bodies, and vitreous traction. One challenge in viewing two-dimensional images generated by these modalities is that a surgeon has to develop a mental three-dimensional model to visualize the anatomy. Another challenge is that many two-dimensional representations require segmentation of the three-dimensional data.

SUMMARY

Disclosed herein is a visualization system with a housing assembly having a head unit configured to be at least partially directed towards a target site. An optical coherence tomography (OCT) module and a stereoscopic camera are located in the housing assembly. A controller is in communication with the OCT module and the stereoscopic camera, the controller having a processor and tangible, non-transitory memory on which instructions are recorded. The controller is adapted to acquire left OCT data and right OCT data of the target site, via the OCT module, and synchronously acquire left camera data and right camera data of the target site, via the stereoscopic camera. The controller is adapted to generate volume-rendered images, including: first and second OCT images respectively based on the left OCT data and right OCT data; and first and second camera images respectively based on the left camera data and right camera data. The first and second OCT images and the first and second camera images have matching parallax.

The volume-rendered images are respectively aligned in perspective, orientation and scaling. The target site may be an eye. The visualization system includes a display unit in communication with the controller. The controller may be adapted to display the volume-rendered images adjacent to one another on the display unit. The controller is adapted to employ a transparency-based channel to display the volume-rendered images in grayscale. The transparency-based channel has a maximum scale indicating full transparency and a minimum scale indicating full opacity. The controller may be adapted to use a variable gamma factor as a function of depth to display the volume-rendered images.

In some embodiments, the OCT module includes a single light source. In other embodiments, the OCT module includes at least two light sources. The OCT module may include a light source outputting a spectrum with a series of frequency sweeps each incorporating a plurality of pulses.

The series of frequency sweeps are equally spaced apart. The OCT module may include a Fourier-domain mode-locked laser.

In one embodiment, the controller is adapted to obtain the volume-rendered images via direct ray casting. In another embodiment, the controller is adapted to respectively obtain the volume-rendered images by first projecting respective voxels from a 3D dataset onto a 2D viewing plane to generate respective projections. Secondly, a composite is created with the respective projections superimposed on each other, the respective projections being estimated based in part on a Gaussian splat. The controller may incorporate a graphics processing unit using a multiple-instruction-multiple-data (MIMD) technique.

Disclosed herein is a method for visualizing a target site with a housing assembly having a head unit configured to be at least partially directed towards the target site. An optical coherence tomography (OCT) module and a stereoscopic camera are installed in the housing assembly. A controller in communication with the OCT module and the stereoscopic camera, the controller having a processor and tangible, non-transitory memory on which instructions are recorded. The method includes acquiring left OCT data and right OCT data of the target site, via the OCT module, and synchronously acquiring left camera data and right camera data of the target site, via the stereoscopic camera. The method includes generating volume-rendered images, including: first and second OCT images respectively based on the left OCT data and the right OCT data, and first and second camera images respectively based on the left camera data and the right camera data. The first and second OCT images and the first and second camera images have matching parallax.

The above features and advantages and other features and advantages of the present disclosure are readily apparent from the following detailed description of the best modes for carrying out the disclosure when taken in connection with the accompanying drawings.

Figure 1:
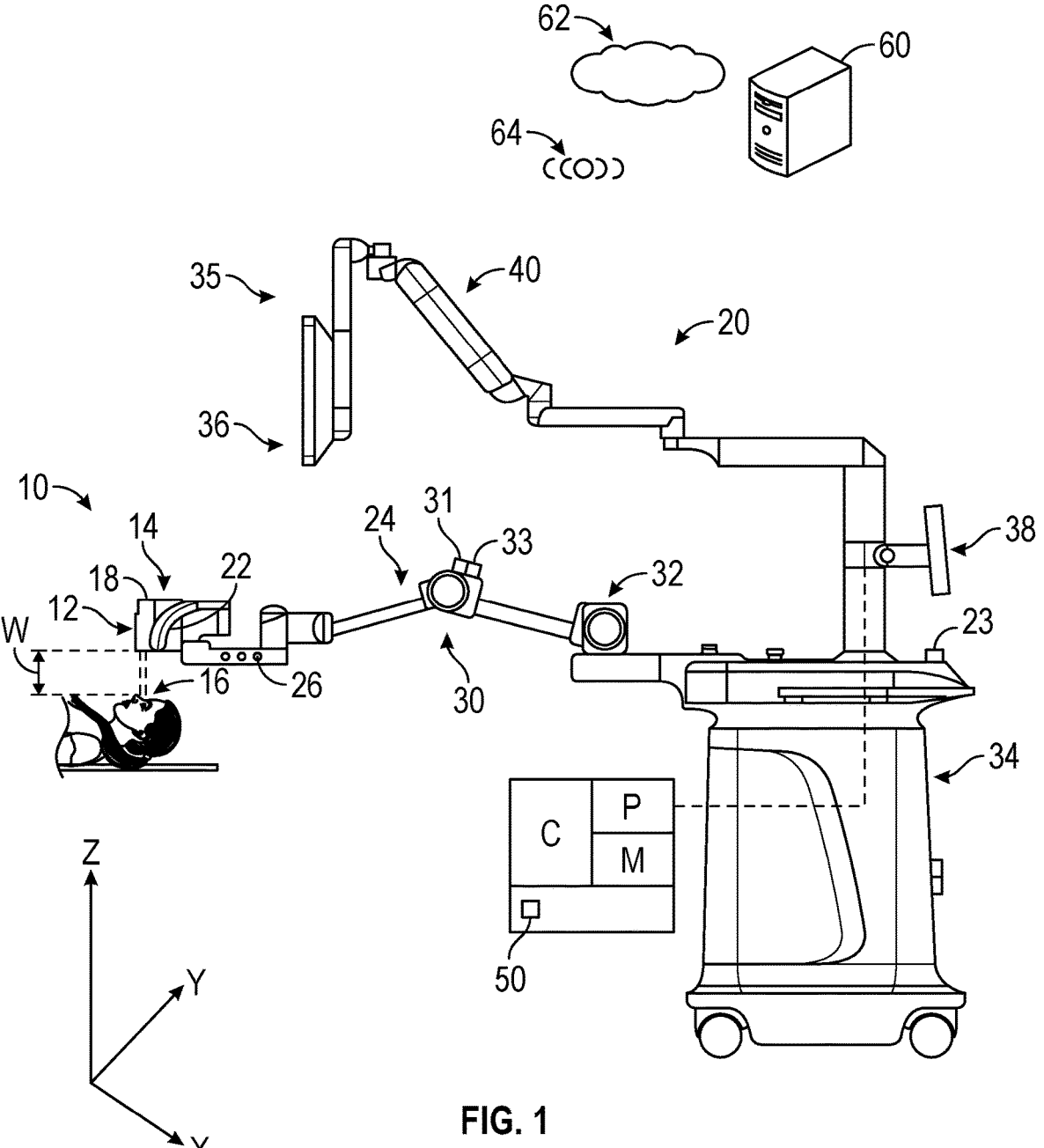
FIG. 1 is a schematic fragmentary perspective view of a visualization system having an optical coherence tomography (OCT) module, a stereoscopic camera, a display unit and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a visualization system 10 having a stereoscopic camera 12 and an optical coherence tomography module 14 (referred to hereinafter as "OCT module 14"). The visualization system 10 (referred to hereinafter as "system 10") is configured to image a target site 16. The stereoscopic camera 12 is configured to record first and second images of the target site 16, which may be employed to generate a live two-dimensional stereoscopic view of the target site 16. The system 10 may include an integrated digital surgical microscopic system. It is understood that the system 10 may take many different forms and include multiple and/or alternate components and facilities.

Referring to FIG. 1, the stereoscopic camera 12 may be located in a head unit 18 of a housing assembly 20, with the head unit 18 configured to be at least partially directed towards the target site 16. The housing assembly 20 may be self-contained and movable between various locations. The target site 16 may be an anatomical location on a patient, a laboratory biological sample, calibration slides/templates, etc. In the example shown in FIGS. 2-3, the target site 16 is an eye E.

Referring to FIG. 1, at least one input device 22 ("at least one" omitted henceforth) is operatively connected to the stereoscopic camera 12 (e.g., at the head unit 18) to allow a user to manually position it. The input device 22 may include respective controls for activating or selecting specific features, such as focus, magnification, adjusting an amount/type of light projected onto the target site 16 and other features. It is understood that the number and form of the input devices 22 may be varied, for example, the input device 22 may include a joystick, wheel, mouse or touchscreen device. In some embodiments, the input device 22 may be controlled via a remote-control unit 23 (see FIG. 1).

In some embodiments, the system 10 may include a robotic arm 24 operatively connected to and configured to selectively move the head unit 18. For example, referring to FIG. 2, the robotic arm 24 may be selectively operable to extend a viewing range of the OCT module 14 along an X-direction, Y-direction and Z direction. Referring to FIG. 1, the head unit 18 may be mechanically coupled to the robotic arm 24 via a coupling plate 26. The robotic arm 24 may include one or more joints, such as first joint 30 and second joint 32, configured to provide further degrees of positioning and/or orientation of the head unit 18. Referring to FIG. 1, a respective joint motor (such as joint motor 31) and a respective joint sensor (such as joint sensor 33), may be coupled to each joint. The joint motor 31 is configured to rotate the first joint 30 around an axis, while the joint sensor 33 is configured to transmit the position (in 3D space) of the first joint 30.

Referring to FIG. 1, the system 10 includes a controller C having at least one processor P and at least one memory M (or non-transitory, tangible computer readable storage medium) on which instructions are recorded for executing method 300, described below with respect to FIG. 4, of operating a stereo-volumetric mode 50 for producing volume-rendered images. The memory M can store controller-executable instruction sets, and the processor P can execute the controller-executable instruction sets stored in the memory M. The OCT module 14 and the stereoscopic camera 12 may include integrated processors in communication with the controller C.

In many two-dimensional representations of three-dimensional data, the challenge is to integrate the different image processing steps so that the resulting visualization accurately reflects various aspects of the anatomy, including depth information. Additionally, when surgical instruments (e.g., tools 132, 232 in FIGS. 2-3) are represented as surfaces along with the anatomy, parts of the surfaces may become occluded.

The stereo-volumetric mode 50 eliminates segmentation and minimizes errors associated with the complex anatomy found in ophthalmic surgery. Visualization methods are generally based on normal anatomy, however, surgery is often performed on abnormal anatomy. As described below, the controller C is adapted to acquire left OCT data and right OCT data of the target site 16, via the OCT module 14, and synchronously acquire left camera data and right camera data of the target site 16, via the stereoscopic camera 12. The system 10 produces volume-rendered stereo intraoperative images, as opposed to en face images, with matching parallax.

Referring to FIG. 1, the controller C may be configured to process signals for broadcasting on a display unit 35, which may include first and second displays 36 and 38. As described below with respect to FIG. 7, the controller C may be adapted to display the volume-rendered images adjacent to one another on the display unit. The stereo volume rendered OCT display is displayed side-by-side with the digital stereo surgical video display (from the camera 12) and is not superimposed. The display unit 35 may include any type of stereo display available to those skilled in the art, such as a high-definition television, an ultra-high-definition television, projector, one or more computer screens, a laptop computer, digital oculars (near-to-eye display, similar to AR/VR goggles) and may include a touchscreen. Returning to FIG. 1, the first display 36 may be connected to a cart 34 via a flexible mechanical arm 40 with one or more joints to enable flexible positioning. The flexible mechanical arm 40 may be configured to be sufficiently long to extend over a patient during surgery to provide relatively close viewing for a surgeon.

The images of the target site 16 may be presented in different forms, including but not limited to, captured still images, real-time images and/or digital video signals. "Real-time" as used herein generally refers to the updating of information at the same rate as data is received. More specifically, "real-time" means that the image data is acquired, processed, and transmitted at a high enough data rate and a low enough delay that when the data is displayed, objects move smoothly without user-noticeable judder or latency. Typically, this occurs when new images are acquired, processed, and transmitted at a rate of at least about 30 frames per second (fps) and displayed at about 60 fps and when the combined processing of the video signal has no more than about $\frac{1}{30}^{th}$ second of delay.

Figure 2:
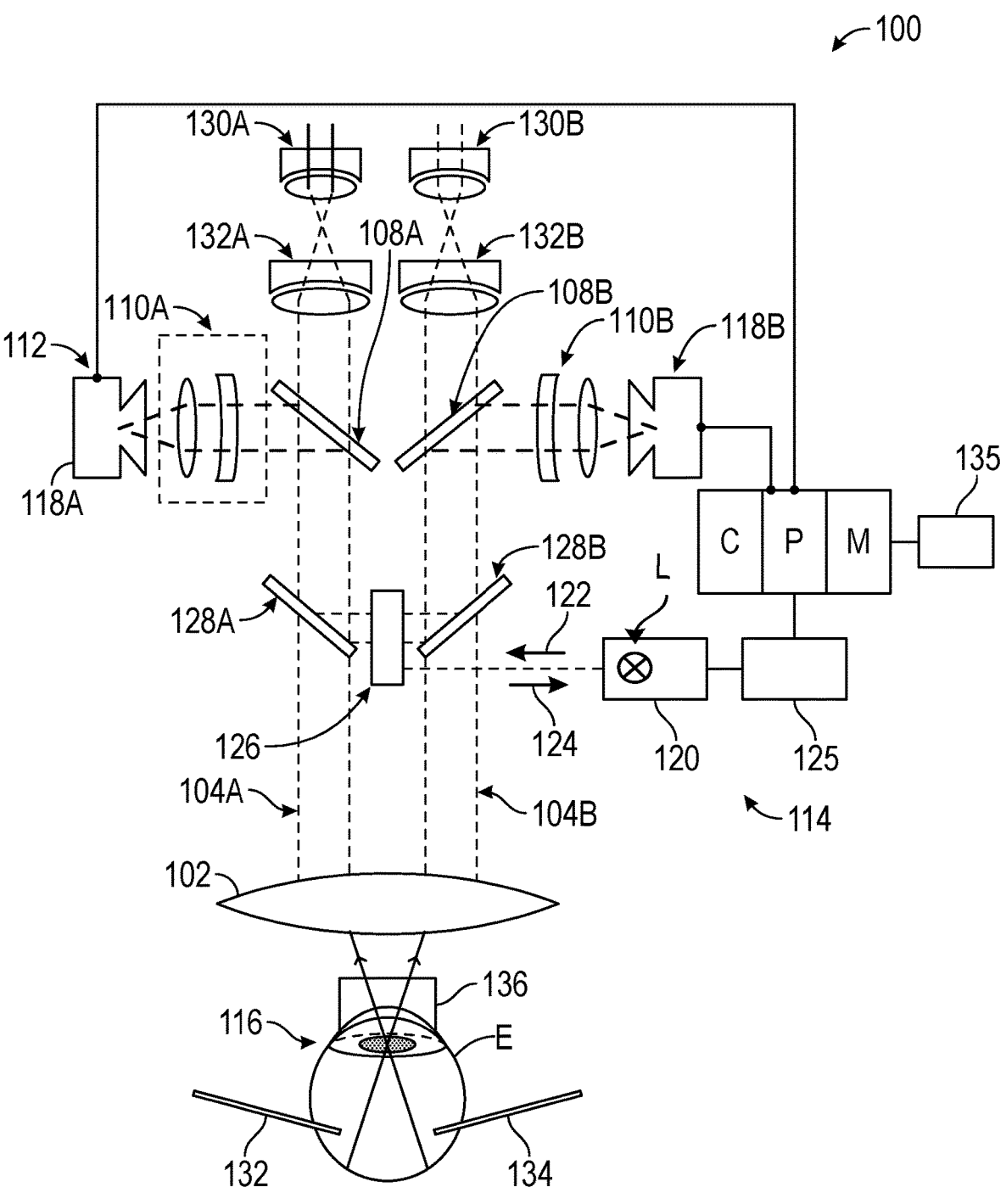
FIG. 2 is a schematic diagram of a portion of the system of FIG. 1, in accordance with one embodiment.

Referring to FIG. 2, a portion of the system 10 is shown, in accordance with a first embodiment. The apparatus 100 of FIG. 2 includes an exemplary stereoscopic camera 112 that is integrated with an OCT module 114 through a shared objective lens 102. Referring to FIG. 2, the stereoscopic camera 112 includes two beam splitters 108A, 108B, two sets of magnifying or focusing optics 110A, 110B, and two high-resolution two-dimensional cameras 118A, 118B for imaging the target site 116. The cameras 118A, 118B may be high-dynamic range cameras with an optimized view accomplished by compressing its dynamic range into a visible range. The apparatus 100 may include any suitable additional optical or mechanical components, for manipulating the light beams and automating the adjustment.

Referring to FIG. 2, the target site 116 is illuminated by a first beam from the OCT module 14 which at least partially overlaps with a second beam (originating from a light source in the stereoscopic camera 112) at the target site 116, which is an eye E. Various surgical tools 132 may be employed by the surgeon, along with an illuminator 134 that provides illumination from within the fundus of eye E. The objective lens 102 may receive the light through an ophthalmic lens 136 that rests on a cornea of the eye E.

In the embodiment shown in FIG. 2, the OCT module 114 includes an OCT scanner 120 (with a single light source L) for generating a sample beam 122. The sample beam 122 is directed to reciprocating optics 126 and subsequently to a set of partial mirrors 128A, 128B. The OCT module 114 receives a measurement beam 124 that is reflected back in response to photons of the sample beam 122 interacting with the target site 116. Shown in FIG. 2 is the left optical path 104A and the right optical path 104B which are configured such that views generated by the OCT module 114 provide a parallax angle identical to the camera view. The left optical path 104A and the right optical path 104B are equal in total distance. A single light source L may be used to generate both the left and right volumetric data in order to have reduced speckle noise (due to angle diversity).

The OCT scanner 120 may include a XY Galvo scanner set, a resonant scanner set, micro-electromechanical systems (MEMS) scanners or other types of scanners. Galvo scanners, also called Galvanometer optical scanners, include motorized mirror mounts for laser-beam steering or scanning applications. The OCT module 114 includes an OCT engine 125, which may be a spectral domain OCT, a swept source OCT, or a time domain OCT that utilizes light point-scanning or point-detection technology. Referring to FIG. 2, the system 10 may further include a binocular surgical microscope with two eye pieces 130A, 130B respectively connected to tube lens sets 132A, 132B. The images obtained may be viewable on a display unit 135.

Figure 3:
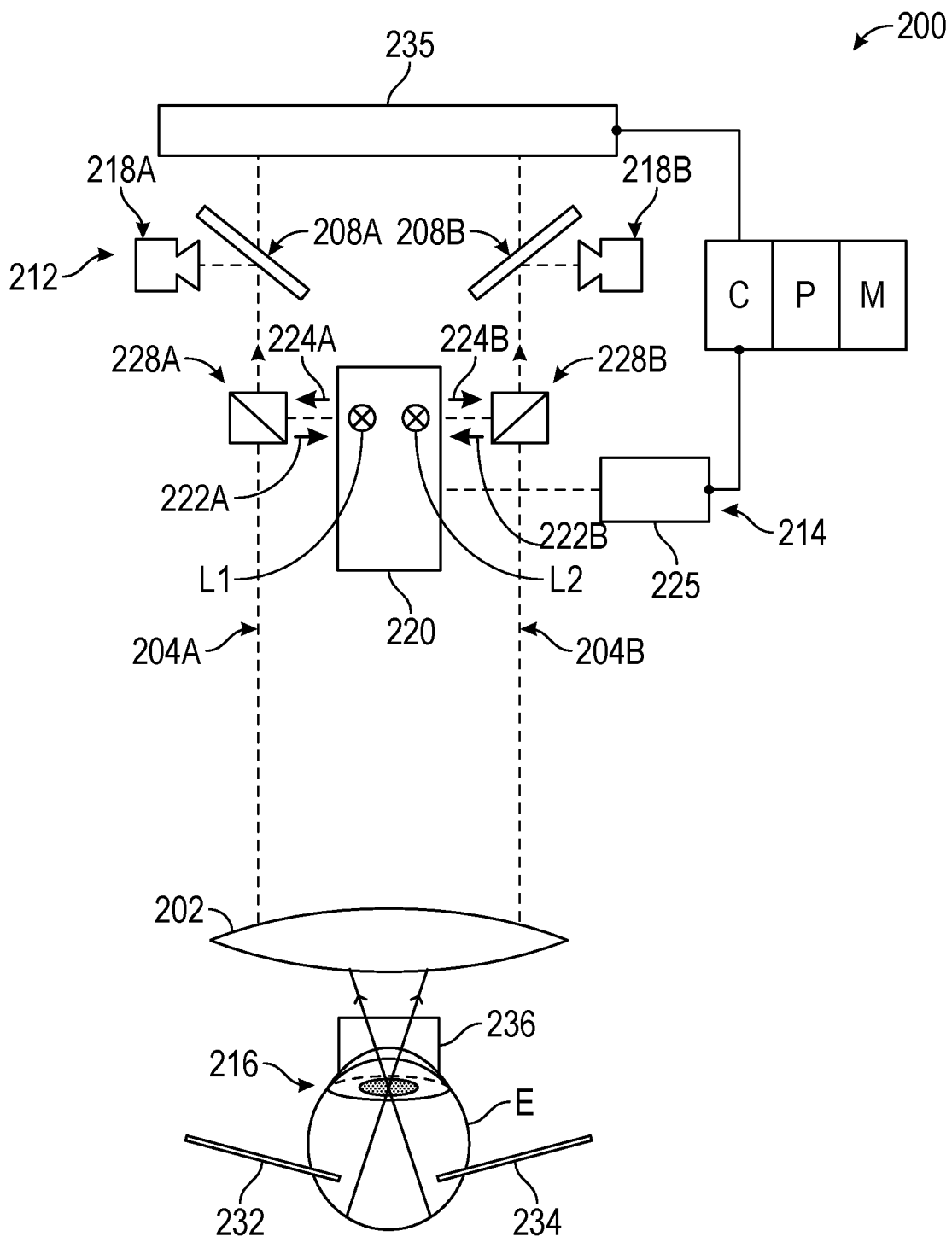
FIG. 3 is a schematic diagram of a portion of the system of FIG. 1, in accordance with another embodiment.

Referring now to FIG. 3, in accordance with a second embodiment, a portion of the system 10 is shown. The apparatus 200 of FIG. 3 includes an exemplary stereoscopic camera 212 that is integrated with an OCT module 214 through a shared objective lens 202. Referring to FIG. 3, the stereoscopic camera 212 includes two beam splitters 208A, 208B and two high-resolution two-dimensional cameras 218A, 218B for imaging a target site 216. In some embodiments, the high-resolution two-dimensional cameras 218A, 218B replace the oculars and may be attachable to a surgical microscope. For simplicity, beam adjusting components are not shown. It is understood that the apparatus 200 may include any suitable additional optical or mechanical components.

In the embodiment shown in FIG. 3, the OCT module 214 includes an OCT scanner 220 with two light sources L1 and L2 respectively generating sample beams 222A, 222B. The OCT scanner 220 may include an XY Galvo scanner set, a resonant scanner set, micro-electromechanical systems (MEMS) scanners or other types of scanners. The OCT module 214 receives measurement beams 224A, 224B that are reflected back in response to photons of the sample beams 222A, 222B, respectively, interacting with the target site 216. Shown in FIG. 3 is the left optical path 204A and the right optical path 204B, which are configured such that views generated by the OCT module 214 provide a parallax angle identical to the camera view. The left optical path 204A and the right optical path 204B are equal in total distance.

Referring to FIG. 3, the sample beams 222A, 222B are respectively directed to a set of partial mirrors 228A, 228B. The OCT module 214 includes an OCT engine 225, which may be a spectral domain OCT, a swept source OCT, or a time domain OCT that utilizes light point-scanning or point-detection technology. Various surgical tools 232 may be employed by the surgeon, along with an illuminator 234 that provides illumination from within the fundus of eye E. The objective lens 202 may receive the light through an ophthalmic lens 236 that rests on a cornea of the eye E. The images obtained may be viewable on a display unit 235.

Figure 4:
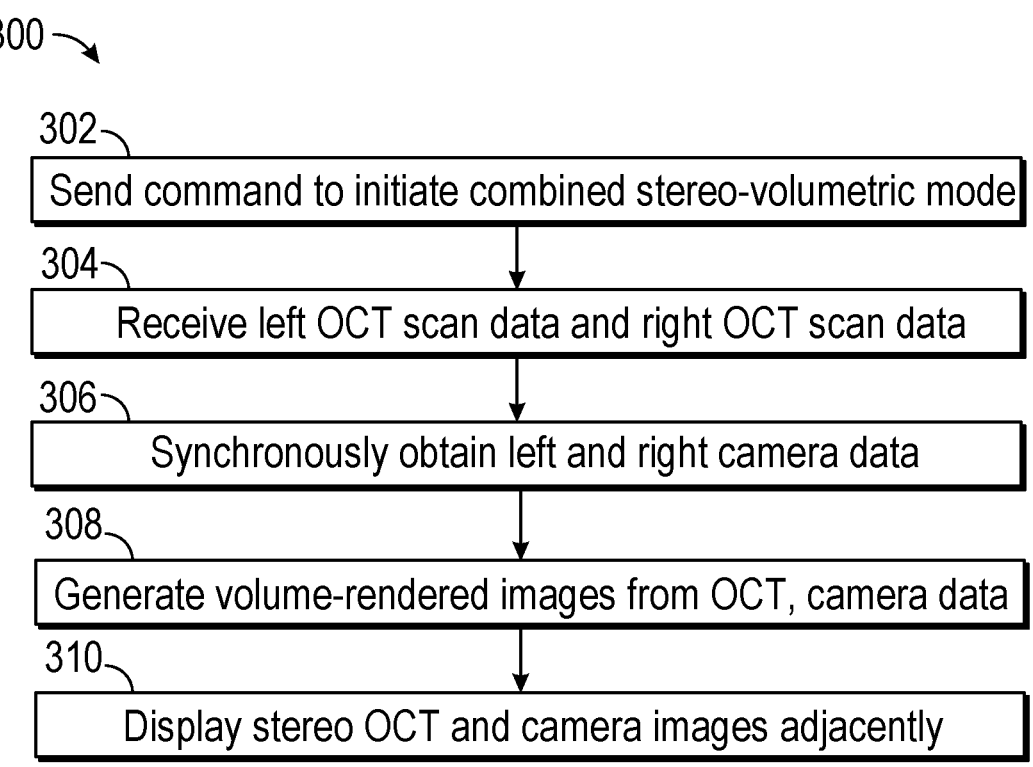
FIG. 4 is a flowchart of an example method executable by the controller of FIG. 1.

Referring now to FIG. 4, a flowchart is shown of an example method 300 for operating the stereo-volumetric mode 50 of FIG. 1. Method 300 may be embodied as computer-readable code or instructions stored on and partially executable by the controller C of FIG. 1. Method 300 need not be applied in the specific order recited herein and may be dynamically executed. Furthermore, it is to be understood that some steps may be eliminated. Method 300 may be executed periodically or at predefined time intervals.

Per block 302 of FIG. 4, the controller C is programmed to send a command to initiate the combined stereo-volumetric mode 50. Proceeding to block 304 of FIG. 4, the controller C is programmed to acquire OCT raw data of the scanned region, including receiving left OCT scan data and right OCT scan data, e.g., via left optical path 104A, 204A and the right optical path 104B, 204B, respectively. The scanned OCT dataset may be 3D volumes or two-dimensional B-frames that includes sequentially scanned A-scans (depth scans), according to various scanning patterns. The raw OCT data is post-processed through an OCT reconstruction pipeline including background removal, spectral windowing, dispersion compensation, fast Fourier transform and logarithmic compression, into a depth-resolved 3D volume. While some processing techniques are noted above, it is understood that other techniques may be employed.

Figure 5:
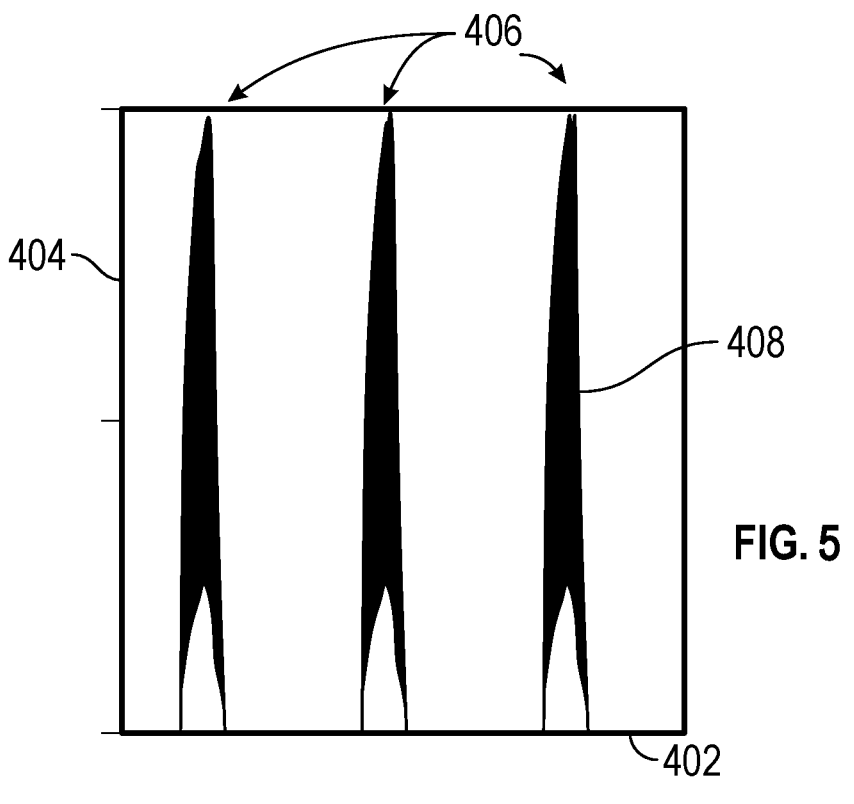
FIG. 5 is a schematic example graph of intensity output for an example OCT source employable in the system of FIG. 1.

FIG. 5 is a schematic example graph of a spectrum for an example OCT source (e.g., single source L in FIG. 2 and sources L1, L2 in FIG. 3) employable in the system 10, with frequency shown on the horizontal axis 402 and intensity or amplitude shown on the vertical axis 404. The spectrum has a series of frequency sweeps 406 that are spaced apart equally. Each sweep incorporates a plurality of pulses 408 providing an ultra-high sampling rate.

The OCT source (e.g., single source L in FIG. 2 and sources L1, L2 in FIG. 3) may include a Fourier-domain mode-locked laser. Mode locking allows a laser to produce pulses of light of extremely short duration by creating a fixed phase relationship between the longitudinal modes of the resonant cavity in the laser. Constructive interference between these modes causes the laser light to be produced as a train of pulses. The pulse duration may be on the order of picoseconds ($10^{-12}$ s) or femtoseconds ($10^{-15}$ s). In one example, the coherence length of the example OCT source is between 30 and 50 mm. In another example, the coherence length is at least 50 mm. To manage artifacts caused by the increased coherence length, circular ranging may be employed.

Proceeding to block 306 of FIG. 5, synchronous with the scanning, the controller C is programmed to obtain left camera data and right camera data e.g., via left optical path 104A, 204A and the right optical path 104B, 204B, respectively.

Advancing to block 308 of FIG. 4, the controller C is adapted to generate volume-rendered images, including: first and second OCT images 602 (see FIG. 7) respectively based on the left OCT data and right OCT data; and first and second camera images 604 (see FIG. 7) respectively based on the left camera data and right camera data. The first and second OCT images 602 (see FIG. 7) and the first and second camera images 604 (see FIG. 7) have matching parallax. Parallax is a displacement or difference in the apparent position of an object viewed along two different lines of sight and is measured by the angle or semi-angle of inclination between those two lines. The volume-rendered images are respectively aligned in perspective, orientation and scaling.

Volume rendering is understood to be a set of techniques used for displaying a two-dimensional projection of a three-dimensional discretely sampled data set. Direct volume rendering involves mapping volume data directly to optical properties, whereas indirect volume rendering maps part of volume data to points, lines and surfaces. The mapping is defined by a transfer function.

In one embodiment, the controller C is adapted to obtain the volume-rendered images via ray casting. Here, for each pixel in the two-dimensional projection, a ray is traced back into each voxel. A voxel is an individual volume element corresponding to a location in three-dimensional data space and has one or more data values associated with it. The controller is adapted to determine the grayscale value by considering the voxels which are involved, weighted with transparency. The controller C may adopt ray tracing techniques tracing the propagation of light through the eye E through reflection and refraction using Snell's law.

In another embodiment, the controller C is adapted to obtain the volume-rendered images by first projecting voxels from the 3D datasets onto a 2D viewing plane to generate respective projections. Secondly, a composite is created with the respective projections superimposed on each other. The projections are estimated based in part on a Gaussian splat. Alternatively, the system 10 may employ texture-based volume rendering, where the voxels are loaded in a texture mapping hardware.

Figure 7:
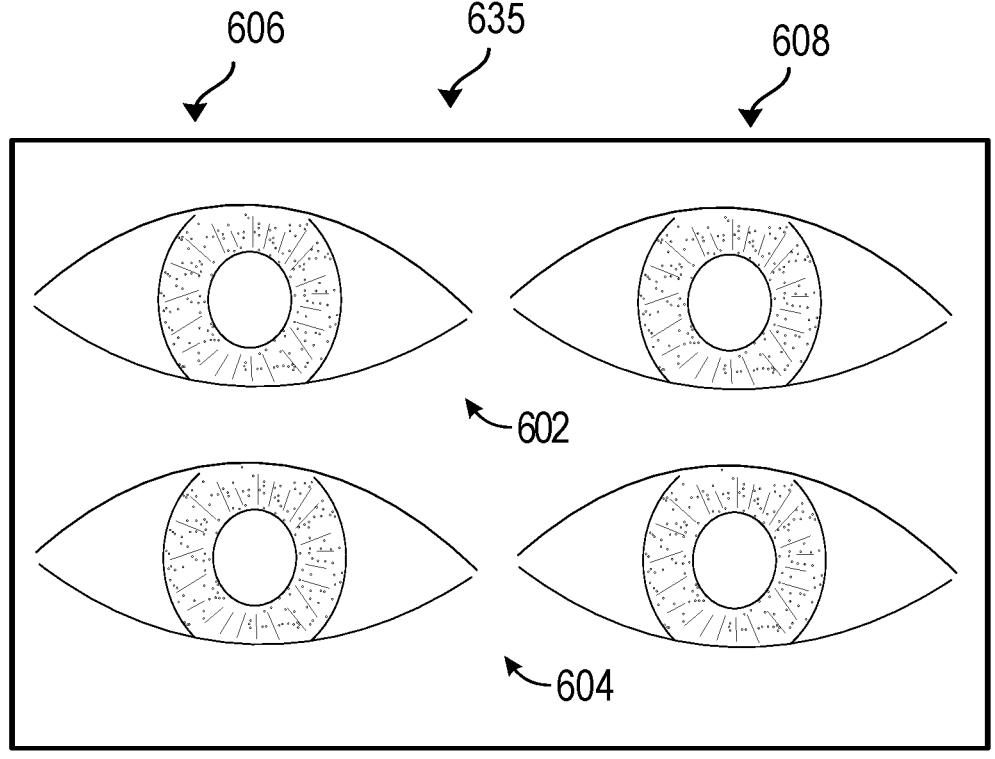
FIG. 7 is a schematic diagram of an example display unit employable in the system of FIG. 1.
Figure 7:
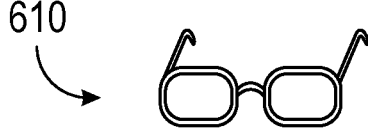

Per block 310 of FIG. 4, the controller is adapted to display the stereo OCT and camera images adjacently. FIG. 7 is a schematic diagram of an example display unit 635 employable in the system. Referring now to FIG. 7, the volume-rendered first and second OCT images 602 and the volume-rendered first and second camera images 604 may be displayed adjacent to one another on a display unit 635. The volume-rendered first and second OCT images 602 and the volume-rendered first and second camera images 604 are presented as a stereo pair of volumes to the surgeon's visual cortex. The display unit 635 incorporates a stereoscopic display system, with a two-dimensional display having separate images for the left eye (left view 606) and right eye (right view 608).

Referring to FIG. 7, the user wears special glasses (e.g., optical viewer 610) that work in conjunction with the display unit 635 to show the left view 606 to the user's left eye and the right view 608 to the user's right eye. The optical viewer 610 may utilize lenses, prisms or mirrors to deliver the separate stereo images simultaneously but independently to each eye, allowing the brain to fuse the pair and recreate a three-dimensional image. Additionally, the optical viewer 610 may include a field mask to prevent cross-viewing between eyes. The surgeon may intuitively slightly rotate the eye nasal/temporal (left/right) and superior/inferior (up/down) to solve obscuration ambiguity issues and projection artifacts and improve spatial understanding. Stated differently, ocular rotation using left-right pair of surgical instruments is used to resolve obscuration ambiguities, projection artifacts and build a 3D mental model correlated with digital video 3D appearance, without any user interface orientation manipulation. The system 10 involves cognitive or volitional selection of a depth subset (visual horopter or Panum's fusional area) of volume by the user. When a disparity object is inside Panum's area of fusion, the image is fused such that the user views a single image of the object. When the object is outside of Panum's area of fusion, the user sees two images of the object. In one example, the display unit 635 is a 35-55-inch, 3D 4K organic light-emitting diode (OLED) surgical display viewed with passive, circularly polarized 3D eyeglasses.

The controller C is adapted to employ a transparency-based channel to display the volume-rendered images in grayscale. The transparency-based channel has a maximum scale (e.g., scale having a value of 1.0) indicating approximately full transparency and a minimum scale indicating approximately full opacity (e.g., scale having a value of 0.0). In one embodiment, the system 10 employs only the transparency-based channel in grayscale without any red, green and blue components.

Figure 6:
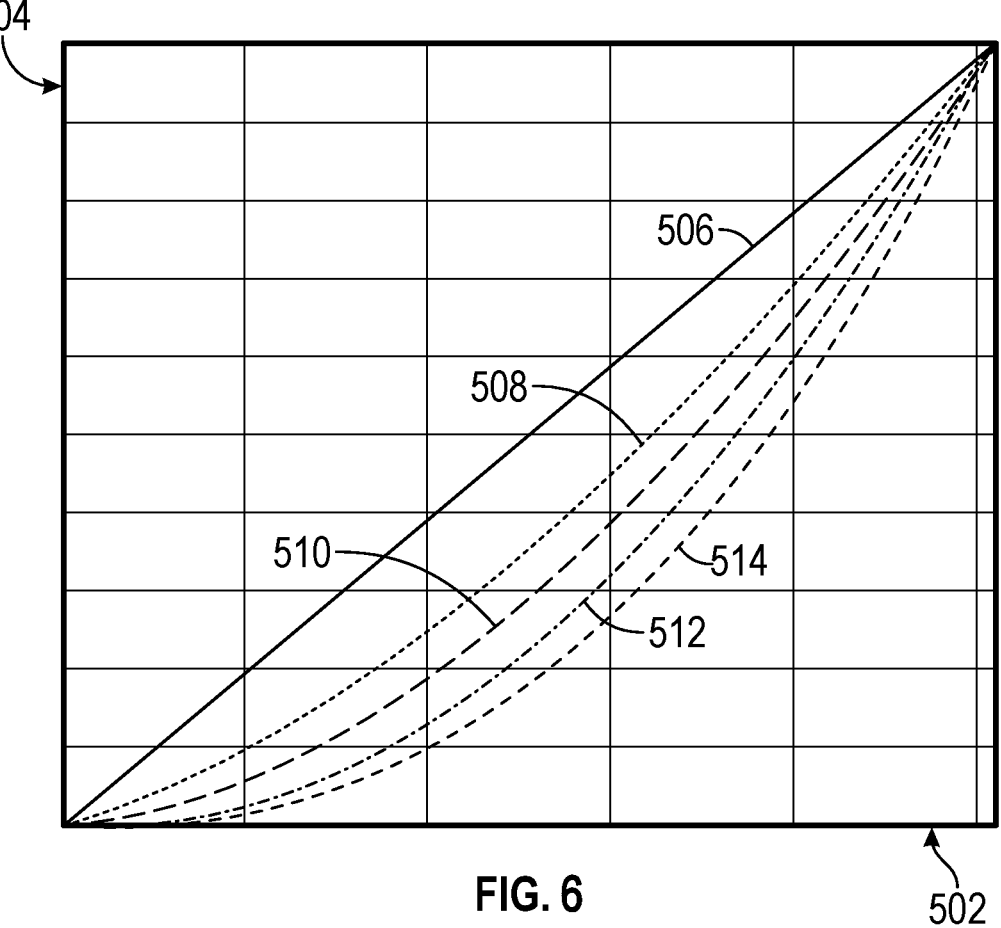
FIG. 6 is a schematic example graph of gamma traces employable for displaying the images generated by the system of FIG. 1, with screen brightness on the vertical axis and pixel value on the horizontal axis.

The controller C may be adapted to use a variable gamma factor as a function of depth to display the volume-rendered images. In other words, objects at different depths are depicted in the 2D representation using a different gamma. FIG. 6 is a schematic example graph of gamma traces employable by the system 10, showing relative brightness (e.g., extending from 0 to 1) on the vertical axis 504 and pixel value (e.g., extending from 0 to 256) on the horizontal axis 502. Gamma traces 506, 508, 510, 512 and 514 represent gamma values of 1, 1.5, 1.8, 2.2, 2.5, respectively. Each gamma trace is used for a different depth. In one example, a lower gamma value is used for the anatomical regions for which higher visibility or higher brightness is desired. This enables a semi-transparent or nearly transparent cornea and lens (or an intraocular lens) to be displayed in front of the vitreous and retina.

In some embodiments, the controller C may incorporate a graphics processing unit using a multiple-instruction-multiple-data (MIMD) technique, which may be defined as an execution architecture which processes two or more independent sets of instructions simultaneously on two or more sets of data. Here, the controller C includes a number of processors that function asynchronously and independently. The controller C may employ a graphic processing unit (GPU) that supports multi-view rendering, such as rendering up to 4 views in a single pass. The rendering may be performed with a graphics processing unit (GPU) having stereo rendering firmware, such as for example, NVIDA's Turing engine or Field Programmable Gate Arrays (FPGA).

The controller C of FIG. 1 may include, or otherwise have access to, information downloaded from remote sources and/or executable programs. Referring to FIG. 1, the controller C may be configured to communicate with a remote server 60 and/or a cloud unit 62, via a network 64. The remote server 60 may be a private or public source of information maintained by an organization, such as for example, a research institute, a company, a university and/or a hospital. The cloud unit 62 may include one or more servers hosted on the Internet to store, manage, and process data.

The network 64 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The network 64 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of connections may be employed.

In summary, the system 10 enables human visual cortex viewing of volume-rendered stereo pairs, thereby providing accurate 3D visualization during surgery. The system 10 improves signal to noise ratio. The views of the stereoscopic camera 12 are aligned to the views of the OCT module 14 respectively in rotation, translation, scale and perspective. The system 10 addresses complex anatomy segmentation errors, flattening and projection artifacts. The volume-rendered images incorporate a non-flattened and non-segmented stereo view. In other words, there are no segmentation associated errors with the system 10 and there is no flattening which is intrinsic to an en face display mode.

The controller C of FIG. 1 may be an integral portion of, or a separate module operatively connected to, other controllers integrated with the OCT module 14 and stereoscopic camera 12. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart shown in the FIGS. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A visualization system comprising:

a housing assembly having a head unit configured to be at least partially directed towards a target site;

an optical coherence tomography (OCT) module and a stereoscopic camera located in the housing assembly;

a controller in communication with the OCT module and the stereoscopic camera, the controller having a processor and tangible, non-transitory memory on which instructions are recorded;

wherein the controller is adapted to acquire left OCT data and right OCT data of the target site, via the OCT module, and synchronously acquire left camera data and right camera data of the target site, via the stereoscopic camera;

wherein the controller is adapted to generate volume-rendered images, including: first and second OCT images respectively based on the left OCT data and the right OCT data, and first and second camera images respectively based on the left camera data and the right camera data;

wherein the controller employs a transparency-based channel to display the volume-rendered images from the OCT module in grayscale;

wherein the transparency-based channel has a maximum scale indicating approximately full transparency and a minimum scale indicating approximately full opacity; and wherein the first and second OCT images and the first and second camera images have matching parallax.

2. The visualization system of claim 1, wherein the target site is an eye.

3. The visualization system of claim 1, wherein the volume-rendered images are respectively aligned in perspective and scaling.

4. The visualization system of claim 1, further comprising:

a display unit in communication with the controller; and wherein the controller is adapted to display the volume-rendered images adjacent to one another on the display unit.

5. The visualization system of claim 1, wherein the controller is adapted to use a variable gamma factor as a function of depth to display the volume-rendered images.

6. The visualization system of claim 5, wherein the target site is an eye and the variable gamma factor is selected such that a cornea and/or lens of the eye is substantially transparent and a retina of the of the eye is substantially opaque in the volume-rendered images from the OCT module.

7. The visualization system of claim 1, wherein the OCT module includes a single light source.

8. The visualization system of claim 1, wherein the OCT module includes at least two light sources.

9. The visualization system of claim 1, wherein the OCT module includes a light source outputting a spectrum with a series of frequency sweeps each incorporating a plurality of pulses.

10. The visualization system of claim 9, wherein the series of frequency sweeps are spaced apart equally.

11. The visualization system of claim 9, wherein the OCT module includes a mode-locked laser.

12. The visualization system of claim 9, wherein the OCT module includes a laser with a coherence length between about 30 mm and 50 mm.

13. The visualization system of claim 1, wherein the controller incorporates a graphics processing unit using a multiple-instruction-multiple-data (MIMD) technique.

14. The visualization system of claim 1, wherein the controller is adapted to obtain the volume-rendered images based at least partially on ray casting.

15. The visualization system of claim 1, wherein the controller is adapted to respectively obtain the volume-rendered images by:

projecting respective voxels from a 3D dataset onto a 2D viewing plane to generate respective projections; and creating a composite with the respective projections superimposed on each other, the respective projections being estimated based in part on a Gaussian splat.

16. A visualization system comprising:

a housing assembly having a head unit configured to be at least partially directed towards a target site;

an optical coherence tomography (OCT) module and a stereoscopic camera located in the housing assembly;

a controller in communication with the OCT module and the stereoscopic camera, the controller having a processor and tangible, non-transitory memory on which instructions are recorded;

a display unit in communication with the controller;

wherein the controller is adapted to acquire left OCT data and right OCT data of the target site, via the OCT module, and synchronously acquire left camera data and right camera data of the target site, via the stereoscopic camera;

wherein the controller is adapted to generate volume-rendered images, including: first and second OCT images respectively based on the left OCT data and the right OCT data, and first and second camera images respectively based on the left camera data and the right camera data;

wherein the first and second OCT images and the first and second camera images have matching parallax, the volume-rendered images being respectively aligned in perspective and scaling;

wherein the controller is adapted to use a variable gamma factor as a function of depth to display the volume-rendered images; and wherein the controller is adapted to display the volume-rendered images adjacent to one another on the display unit.

17. The visualization system of claim 16, wherein:

the controller employs a transparency-based channel to display the volume-rendered images in grayscale; and the transparency-based channel has a maximum scale indicating approximately full transparency and a minimum scale indicating approximately full opacity.

* * * * *